Figure 1:
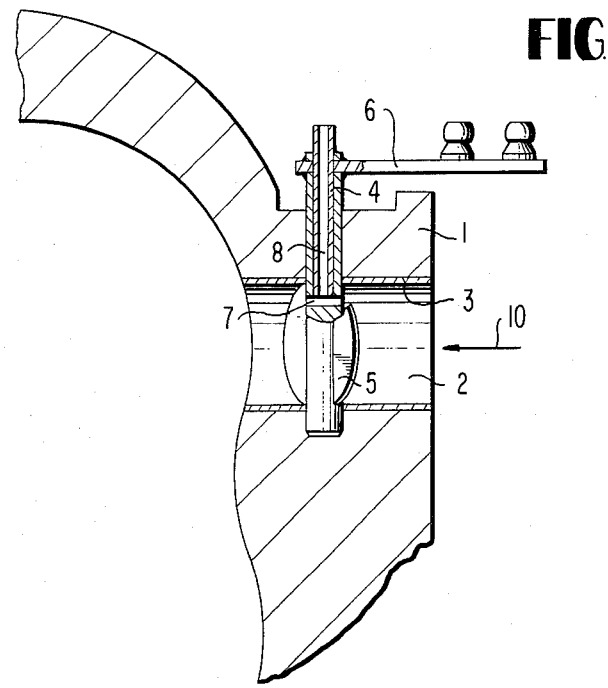

United States Patent [19]
Lamm

[11] 3,908,612
[45] Sept. 30, 1975

[54] ROTARY PISTON INTERNAL COMBUSTION ENGINE
[75] Inventor: Heinz Lamm, Esslingen-St. Bernhardt, Germany
[73] Assignee: Daimler-Benz Aktiengesellschaft, Germany
[22] Filed: Mar. 28, 1974
[21] Appl. No.: 455,537

Related U.S. Application Data
[63] Continuation-in-part of Ser. No. 254,545, May 18, 1972, abandoned.

[30] Foreign Application Priority Data
May 21, 1971 Germany............................ 2125353

[52] U.S. Cl........... 123/8.13; 123/8.45; 123/73 AD; 123/196 R; 92/153; 418/90; 418/100
[51] Int. Cl.² ........................................ F02B 53/04
[58] Field of Search...... 123/8.13, 136, 196 R, 8.45, 123/73 AD; 184/64, 65; 418/100, 90

[56] References Cited
UNITED STATES PATENTS

| 3,140,700 | 7/1964 | Nallinger | 123/8.13 X |
| 3,447,519 | 6/1969 | Marcik | 123/73 AD |
| 3,620,195 | 11/1971 | Lamm | 123/8.13 |
| 3,765,392 | 10/1973 | Froede | 123/8.13 UX |

FOREIGN PATENTS OR APPLICATIONS

| 940,826 | 11/1963 | United Kingdom | 123/8.13 |
| 975,353 | 11/1964 | United Kingdom | 123/8.13 |
| 1,451,730 | 3/1970 | Germany | 123/8.13 |

Primary Examiner—Clarence R. Gordon
Attorney, Agent, or Firm—Craig & Antonelli

[57] ABSTRACT

A rotary piston internal combustion engine including a lubricant oil supply system for supplying oil into an inlet channel of the engine. The lubricant oil supply system includes a channel extending along a support shaft for a pivotal throttle flap member and a cross bore extending completely through the shaft and opening into the inlet channel. The cross bore is inclined at an angle of approximately 40° with respect to the plane of the valve member so as to optimize lubricant supply for all engine operating conditions. The cross bore is located at the side of the inlet channel furthest from the exhaust channel of the engine so as to minimize effects of exhaust gases on the flow of lubricant oil into the inlet channel. In preferred embodiments, the cross bore is spaced approximately 5 mm from the side of the inlet channel which is furthest from the exhaust channel so as to reduce boundary layer effects by being spaced sufficiently from the wall of the inlet channel while also being maximally spaced from the side of the inlet channel closest to the exhaust channel.

24 Claims, 3 Drawing Figures

U.S. Patent   Sept. 30,1975   3,908,612

ROTARY PISTON INTERNAL COMBUSTION ENGINE

BACKGROUND AND SUMMARY OF THE INVENTION

This application is a Continuation-In-Part application of copending application Ser. No. 254,545, filed May 18, 1972 and now abandoned. The disclosure of said copending application is hereby incorporated by reference herein.

The present invention relates to an improved rotary piston internal combustion engine, and more particularly to an improved lubricating system for such an engine.

Preferred embodiments of the present invention relate to engines of trochoidal construction with a throttle valve arranged on a shaft in the inlet channel and with an oil supply into the inlet channel.

It is known to provide two separate supplies of lubricating oil for the lubrication between the housing wall and the piston of a rotary piston internal combustion engine. One of these supplies includes so-called escaping oil, which is the amount of oil which passes by centrifugal force through the lateral piston seal from the piston bearing lubrication arrangement. The second supplies oil by way of an oil mist fed from outside of the housing in order to provide a constant lubricating film for all phases of the engine operation. This additionally necessary oil mist supplied from the outside may be provided as a metered quantity produced by an oil pump driven with a speed reduction. The metered oil quantity to be supplied is dependent upon the engine operating conditions.

In one type of prior art system, the delivery and distribution of the additional oil quantity takes place with a carburetor operation as a so-called mixture lubrication involving the feed of the oil quantity into the fuel and the subsequent mixing of the fuel. In another prior art system, with injection operation a metered oil quantity is supplied wall-bound to the wall of the inlet channel and/or to the casing running surface of the engine, for example, every 30 rotations of the internal combustion engine.

Each of the above-mentioned prior art systems entail disadvantages. With the carburetor operation system, the lubricating capability of the oil, due to the mixture thereof in the fuel, does not fully satisfy the lubricating requirements. Additionally, with the carburetor operation system a part of the oil participates in the combustion. With injection operation systems, pure oil is applied wall-bound to the casing running surface, however, the supply of the oil does not take place continuously because of the small required total oil quantity so that the oil is provided by intermittently after a predetermined number of rotations of the engine piston such that a uniform lubrication during every rotation of the piston does not take place.

The present invention contemplates a lubricating oil system which avoids the above-mentioned disadvantages. According to one feature of the lubricating oil system of the present invention, the shaft of the throttle valve is provided with an oil channel extending in the longitudinal direction of the shaft and terminating in a cross bore extending through the shaft.

In a preferred embodiment of the present invention, the axis of the cross bores subtends an angle of approximately 40° with respect to the plane of the throttle valve. Since a good lateral piston seal is necessary for optimum functioning of the basic lubricating system, the supply of escaping oil is necessarily reduced. During operation, the maximum throughput occurs under full load, during which operation, lubricating oil for the casing walls is supplied primarily by the escaping oil with only a minor amount being fed from the outside. When a throttle valve is opened, the pressure gradient in front and behind the valve member is substantially reduced. Consequently, only a flow of very low velocity can be formed. During operation of the engine with the throttle valve closed, approximately two thirds of the required lubricating oil must be fed from the outside. By inclining the transverse bore at an acute angle of about 40° with respect to the plane of the throttle valve member, a flow is produced which is angularly oriented against the revolving turbulence of the marginal flow (e.g. with an open throttle valve flap). That is, the inclination angle at which the oil is introduced into the inlet channel by the transverse bore is inclined with respect to the flow of air and fuel through the inlet channel, with the consequent result that a finer oil mist is produced than would be the case if the transverse bore extended parallel to the flow of air through the inlet channel.

Since the air flows in through the inlet channel during the entire suction stroke (approximately 350° angle of rotation of the eccentric shaft supporting the piston on an engine of trochoidal construction) and thereby produces a turbulence at the edges of the inlet channel, this inlet air constitutes a very good transporting or conveying means for the oil in order to ensure a continuous and uniform lubricating operation. Furthermore, with injection operation appropriately timed, the oil is again given off by the air to the largest extent before fuel is injected. At full load, the injection time amounts to approximately only 150° angle of rotation of the eccentric shaft. At partial loads, the injection time is considerably shorter.

Since the sucked-in oil mist can again separate into air and oil before fuel is injected, the separated oil streak wets anew the walls, the contact surface and the seals during each suction cycle. With injection operation, the oil particles still possess a greater lubricating capability than in the dissolved condition (as in a fuel-oil mixture with carburetor operation). This oil-mist lubrication assures a better distribution within the space, highest lubricating capability and a continuous renewal during each suction cycle. The preparation of the oil-mist can take place, for example, by utilizing the idling air for idling operation and smaller partial loads. A range in which the wear is largest and therefore highest demands are made of the additional lubrication system is thus completely satisfied. In this range of operation, previous lubricating difficulties can be traced back, in part, to the smaller existing oil quantities (oil from the lubricating circulation and metered oil) as well as to the oil thinning as a result of the fuel condensation.

Furthermore, corrosion wear occurs during the warm-up phase of the engine which, according to experience gained heretofore, exerts a larger influence than the abrasive wear. It therefore suffices to turn-on the metered oil only in the lower load range. At full load, sufficient escaping oil is available from the lubricating circulation.

A further important feature of the present invention is the positioning of the cross bore which opens into the inlet channel to supply the additional oil adjacent the side of the inlet channel which is furtherest from the exhaust channel. In a preferred embodiment of the present invention, the cross bore for the additional oil is disposed at a spacing of approximately 5 mm from the wall of the inlet duct (5 mm from the wall of the inlet channel wall of the inlet channel which is maximally spaced from the exhaust channel in the travel direction of the piston passing thereby).

In rotary piston engines, it is difficult to prevent exhaust gases from entering the inlet duct and having an effect on the flow in the inlet duct, especially the flow in the cross-sectional half of the inlet channel disposed closest to the exhaust channel. The exhaust gases mix with the ambient atmosphere in the inlet channel and strongly heat the same. Experience has indicated that an oil mist produced by an oil supply bore arranged in the center of the inlet channel is included in the range where the exhaust gases effect turbulence and heat. Furthermore, it has been found that strongly heated oil mist loses 75 to 80 percent of its lubricating effectiveness. By arranging the oil supply bore in accordance with the present invention at a spacing of approximately 5 mm with respect to the wall of the inlet channel disposed oppositely of the exhaust channel, the oil mist prepared at the outlet of the oil supply bore enters a suction flow effective in the inlet direction which is not intermixed with the hot exhaust gases. Consequently, the lubricating capability of the oil mist is fully preserved, even during the engine operating conditions whrein the exhaust gases do mix with portions of the flow in the inlet channel. In this connection, during the idling and partial load operation, a strong vacuum eddy is produced on the suction chamber side of the throttle valve, which vacuum eddy sucks undesired exhaust gas into the inlet channel. The amount of air flowing through the oil supply bore somewhat reduces the vacuum and the eddy and prevents the mixing of exhaust gas with the idling mixture. Since the exhaust gas entering in the inlet duct results, in addition to reduction in the lubricating effectiveness of the oil mist, also in misfirings, particularly during idling, the specific arrangement of the cross bore in accordance with the present invention both improves the supply of oil mist and the engine operation.

According to a further feature of the present invention, the oil supply bore is spaced at least a predetermined minimal distance from the wall of the inlet channel so as to avoid adverse boundary layer effects. That is, due to the well known boundary layer effect, the velocity of the mixture immediately adjacent the wall of the inlet channel is low. If the additional oil is supplied only into this low velocity flow, the oil will remain partially in adherence with the inner wall of the intake channel and will flow more or less along the walls into the engine operating chambers, wherein, depending on the structural design of the internal combustion engine, the chamber portions in the proximity of the inlet channel will receive a greater oil supply than the chamber portions which are more distant. That is, a less uniform distribution of the additional oil into the engine chamber portions will be provided if the cross bore is so close to the inlet channel walls as to be subject to the boundary layer effect. By positioning the cross bore spaced sufficiently from the inlet channel wall to avoid the boundary layer effect, while also positioning the cross bore maximally from the side of the inlet channel adjacent the exhaust channel, optimum lubrication effects are obtained.

With the combination of the above-mentioned advantageous features of positioning the oil supply cross bore at an angle of approximately 40° with respect to the plane of the valve member and the location of the cross bore at the side of the inlet channel opposite the exhaust channel, an optimum engine casing oil lubrication effect is obtained with a minimum of constructional expenditures.

According to further features of the present invention, a labyrinth-like or sponge-like material, for example, felt, needle fleece, porous sintered material or a large number of finest filaments or fibers of steel, plastic material, ceramic, glass, carbon, whiskers, microthreads or the like may be arranged in the oil channel and/or in the feed lines. In this manner, a continuous lubrication is possible by the absorption capability of such a material and an exact metering of the oil quantity.

Accordingly, it is an object of the present invention to provide a rotary piston internal combustion engine which avoids by simple means the aforementioned shortcomings and drawbacks encountered in the prior art.

Another object of the present invention resides in a rotary piston internal combustion engine which assures adequate lubrication under all operating conditions.

A further object of the present invention resides in a rotary piston internal combustion engine provided equipped with an additional lubricating system which assures adequate lubrication of the running surface in the casing, of the walls, and of the seals regardless of whether used with carburetor or injection-type engines.

A still further object of the present invention resides in a rotary piston internal combustion engine which assures a continuous lubrication by means of additional oil quantities as required.

Another object of the present invention resides in a rotary piston internal combustion engine which is characterized by a continuous and uniform lubrication of all of its parts.

Figure 2:
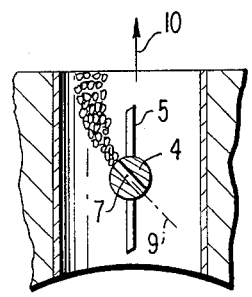
Figure 3:
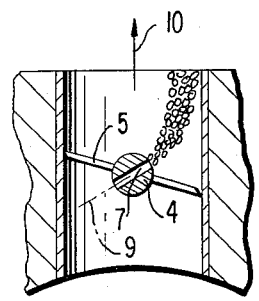

These and other objects, features and advantages of the present invention will become more apparent from the following description when taken in connection with the accompanying drawing which shows, for purposes of illustration only, one embodiment in accordance with the present invention, and wherein:

FIG. 1 is a partial cross-sectional view through the area of the inlet channel of a rotary piston internal combustion engine in accordance with the present invention, with the cross section taken in the axial direction of the throttle valve axis; and FIGS. 2 and 3 are partial cross-sectional views through the inlet channel taken at right angle to the throttle valve axis (i.e., at right angle to FIG. 1) and illustrating the throttle valve in different opening conditions.

Referring now to the drawing wherein like reference numerals are used throuhout the various views to designate like parts, and more particularly to FIG. 1, that area of the housing of a rotary piston internal combustion engine — otherwise conventional construction — is illustrated in this figure in which is located the inlet channel 2 which is equipped with a sleeve or liner 3. An exhaust channel 11 is arranged ahead of the inlet channel 2 with respect to the travel direction of the piston indicated by arrow R. Exhaust gases which flow into the portion of the inlet channel 2 disposed closest to the exhaust channel 11 are depicted by the three-headed arrow E.

Transversely to the longitudinal axis of the inlet channel 2 is pivotally arranged a throttle valve 5 securely connected with a shaft 4 and pivotal about the longitudinal axis of the shaft 4 by way of a lever 6. The shaft 4 is equipped with an oil channel 8 extending in the longitudinal direction of the shaft 4 and terminating in a cross bore 7 which extends through the shaft 4. The axis 9 of the cross bore 7 forms an angle of about 40° with the plane of the throttle valve 5, as best shown in FIGS. 2 and 3. Due to this angular inclination of the cross bore with respect to the plane of the throttle valve 5, it is achieved that in every position of the throttle valve 5, a substantial directional component of the cross bore 7 is present in the suction direction 10. In FIG. 2, the position of the throttle valve 5 at full load is illustrated, while in FIG. 3 the position of the throttle valve 5 in the idling position is shown. In the idling and partial load range, air flows through the cross bore 7 with a high velocity and tears along the metering oil as mist in the suction direction 10. With increasing full-load position of the throttle valve 5, this cross bore 7 has an injector-like effect. Consequently, the cross bore 7 will act as an oil atomizer in all operating positions of the throttle valve. Further, since the cross bore 7 is inclined at an acute angle, the flow of air and oil mist therefrom is at an angle with respect to any backflow of gases in the inlet channel resulting from the flow of exhaust gases E so as to effect optimum atomization even during these conditions.

For increasing the atomizer effect, a slight amount of gas or air supplied external of the engine, or air supplied by the engine taken from the compression or expansion phase thereof may be utilized. Conventional means may be utilized thereby for obtaining this slight amount of gas or air, for example, by way of a line or lines with suitable check valves connected with the compression and/or expansion phase of the engine.

Referring to FIG. 1, the cross bore 7 is located at a small spacing $d$ from the wall of the inlet channel 2 which is disposed oppositely of the exhaust channel 11. In a preferred illustrated embodiment, the spacing $d$ is 5 mm, which space is sufficient to avoid boundary layer effects while still maximally spacing the cross bore 7 from the exhaust channel 11 so as to reduce the effect of the exhaust gases E on the supply of lubricant oil by way of cross bore 7.

Oil is supplied to oil channel 8 by way of oil pump 12, schematically illustrated in FIG. 1. Labyrinth or a sponge-like material is depicted by reference numeral 13 within the oil channel 8.

As indicated above, the quantity of oil fed from the outside is forced by means of the pump 12 into the oil conduit with approximately every thirtieth rotation of the piston. This pumping procedure preferably takes place during 7–8 revolutions of the piston. The porous material 13 provided in the oil feed conduit serves as an oil reservoir which uniformly dispenses the oil through the transverse bore 7 of throttle valve stem until, after another thirty revolutions of the piston, additional oil is introduced by the pump.

In particularly preferred embodiments, the distance $d$ of the transverse bore 7 from the wall 3 of the inlet duct 2 is in the range of from one-fifth to one-eighth of the diameter of the inlet duct cross section.

While I have shown and described one embodiment in accordance with the present invention, it is understood that the same is not limited thereto but is susceptible of numerous changes and modifications as would be known to those skilled in the art given the present disclosure, and I therefore do not wish to be limited to the details shown and described herein but intend to cover all such changes and modifications as are encompassed by the scope of the appended claims.

What I claim:

1. A rotary piston internal combustion engine comprising:
    a piston accommodating housing,
    a rotary piston rotatably movable within said housing,
    inlet channel means for admitting the fuel and air supply into said housing,
    exhaust channel means for accommodating discharge of exhaust gases from said housing,
    said exhaust channel means opening into said housing at a position spaced ahead of the opening of said inlet channel means into said housing with respect to the travel direction of said piston,
    a throttle valve member arranged in said inlet channel means for controlling the opening thereof,
    and lubricating oil supply means for supplying lubricating oil to said inlet channel means, said lubricating oil supply means including bore means opening into said inlet channel means at an oil outlet position spaced from channel walls delimiting said inlet channel means, said channel walls including a first wall portion disposed at the side of the inlet channel means closest to said exhaust channel means and a second wall portion disposed at the side of the inlet means furtherest from said exhaust channel means, said oil outlet position being closer to said second wall portion than to said first wall portion.

2. An engine according to claim 1, wherein said oil outlet position is approximately 5 mm from said second wall portion.

3. A rotary piston internal combustion engine comprising:
    a piston accommodating housing,
    a rotary piston rotatably movable within said housing,
    inlet channel means for admitting a fuel and air supply into said housing,
    exhaust channel means for accommodating discharge of exhaust gases from said housing,
    said exhaust channel means opening into said housing at a position spaced ahead of the opening of said inlet channel means into said housing with respect to the travel direction of said piston,
    a throttle valve member arranged in said inlet channel means for controlling the opening thereof,
    and lubricating oil supply means for supplying lubricating oil to said inlet channel means, said lubricating oil supply means including bore means opening into said inlet channel means at an oil outlet position spaced from channel walls delimiting said inlet channel means, said channel walls including a first wall portion disposed at the side of the inlet channel means closest to said exhaust channel means and a second wall portion disposed at the side of the inlet channel means furthest from said exhaust channel means, said oil outlet position being closer to said second wall portion than to said first wall portion, wherein a throttle valve shaft is provided which is secured to said valve member and supported at said inlet channel means for facilitating pivotal movement of said valve member about the longitudinal axis of said shaft, wherein said valve member has a flat planar configuration which extends in a plane containing said longitudinal axis, wherein said lubricating oil supply means includes an oil channel means extending through portions of said shaft along said longitudinal axis, and wherein said bore means is a cross bore means extending through portions of said shaft in a direction transverse to said longitudinal axis, said cross bore means extending from said oil channel means to said oil outlet position, said oil outlet position being located on an edge portion of said shaft which is spaced from the plane of said valve member.

4. An engine according to claim 3, wherein said cross bore means is a bore which extends completely through said shaft along a cross bore axis.

5. An engine according to claim 4, wherein said cross bore axis extends at an acute angle with respect to the plane of said valve member.

6. An engine according to claim 5, wherein said acute angle is approximately 40° so as to optimize the supply of lubricating oil for all positions of said valve member.

7. An engine according to claim 3, further comprising oil-absorptive means positioned in at least one of said oil channel means and an oil line leading to said oil channel means for providing a substantially continuous and uniform lubrication.

8. An engine according to claim 5, further comprising oil-absorptive means positioned in at least one of said oil channel means and an oil line leading to said oil channel means for providing a substantially continuous and uniform lubrication.

9. An engine according to claim 3, further comprising additional fluid supply means for supplying an additional small amount of fluid to said cross bore means to increase the atomizing of the lubricating oil supplied from said cross bore means into said inlet channel means.

10. An engine according to claim 5, further comprising additional fluid supply means for supplying an additional small amount of fluid to said cross bore means to increase the atomizing of the lubricating oil supplied from said cross bore means into said inlet channel means.

11. An engine according to claim 4, wherein open ends of said cross bore means are spaced from the internal walls of said inlet channel means for all positions of said valve member.

12. An engine according to claim 7, wherein said oil-absorptive means essentially consists of labyrinth-like or sponge-like material.

13. An engine according to claim 12, characterized in that said material is selected from the group consisting of fel, needle fleece, porous sintered material and of a large number of very thin filaments or fibers of steel, plastic material, ceramics, glass, carbon, whiskers, or micro-threads.

14. An engine according to claim 9, wherein said additional fluid supply means supply gas from the engine.

15. An engine according to claim 9, wherein said additional fluid supply means supply gas from a source external of said engine.

16. A rotary piston internal combustion engine comprising:

inlet channel means for admitting a fuel and air supply to said engine, a throttle valve member arranged in said inlet channel means for controlling the opening of said inlet channel means, a throttle valve shaft secured to said valve member and supported at said inlet channel means for facilitating pivotal movement of said valve member about the longitudinal axis of said shaft, said valve member extending in a plane containing said longitudinal axis, and lubricating oil supply means for supplying lubricating oil to said inlet channel means, said lubricating oil supply means including an oil channel means extending through portions of said shaft along said longitudinal axis and cross bore means extending through portions of said shaft in a direction transverse to said longitudinal axis, said cross bore means extending from said oil channel means to at least one opening on the edge of said shaft which is spaced from the plane of said valve member, wherein said cross bore means is a bore which extends completely through said shaft along a cross bore axis, and wherein said cross bore axis extends at an acute angle with respect to the plane of said valve member.

17. An engine according to claim 16, wherein said acute angle is approximately 40° so as to optimize the supply of lubricating oil for all positions of said valve member.

18. An engine according to claim 16, wherein said valve member has a flat planar configuration which extends in said plane.

19. A rotary piston internal combustion engine comprising:

inlet channel means for admitting a fuel and air supply to said engine, throttle valve means extending in a given plane and arranged in said inlet channel means for controlling the opening of said inlet channel means, throttle valve shaft means secured to said throttle valve means and having a longitudinal shaft means axis, and lubricating oil supply means for supplying oil to said inlet channel means and including cross bore means opening into said inlet channel means at an oil outlet position located within said inlet channel means and spaced from channel walls delimiting said inlet channel means, wherein said cross bore means extends along a cross bore axis at an acute angle with respect to the plane of said throttle valve means.

20. An engine according to claim 19, wherein said cross bore means extends through said throttle valve shaft means in a direction transverse to said longitudinal shaft means axis.

21. An engine according to claim 20, wherein said cross bore means has a fluid flow connection with oil channel means extending through portions of said throttle valve shaft means along said longitudinal shaft means axis.

22. An engine according to claim 19, wherein said throttle valve means extends in a plane containing said longitudinal shaft means axis.

23. An engine according to claim 1, wherein said outlet position is located in said inlet channel means.

24. An engine according to claim 19, wherein said bore means is located in said inlet channel means.

* * * * *

UNITED STATES PATENT OFFICE
CERTIFICATE OF CORRECTION

Patent No. 3,908,612          Dated  September 30, 1975

Inventor(s)  Heinz LAMM

It is certified that error appears in the above-identified patent and that said Letters Patent are hereby corrected as shown below:

Title page as it reads now:

[30]      Foreign Application Priority Data

May 21, 1971    Germany............ 2125353

Title page as it should read:

[30]      Foreign Application Priority Data

May 21, 1971    Germany............ 2125435.3

Signed and Sealed this twenty-seventh Day of January 1976

[SEAL]

Attest:

RUTH C. MASON
Attesting Officer

C. MARSHALL DANN
Commissioner of Patents and Trademarks